W. F. Arnold,
Lifting Jacks.
N° 85,264. Patented Dec. 29, 1868.

UNITED STATES PATENT OFFICE.

WILBUR F. ARNOLD, OF NEW BRITAIN, CONNECTICUT.

IMPROVEMENT IN LIFTING-JACKS.

Specification forming part of Letters Patent No. 85,264, dated December 29, 1868.

*To all whom it may concern:*

Be it known that I, WILBUR F. ARNOLD, of New Britain, in the county of Hartford and State of Connecticut, have invented a new and Improved Lifting-Jack; and I do hereby declare that the following is a full, clear, and exact description thereof, which will enable others skilled in the art to make and use the same, reference being had to the accompanying drawings, making a part of this specification, in which—

Figure 1:
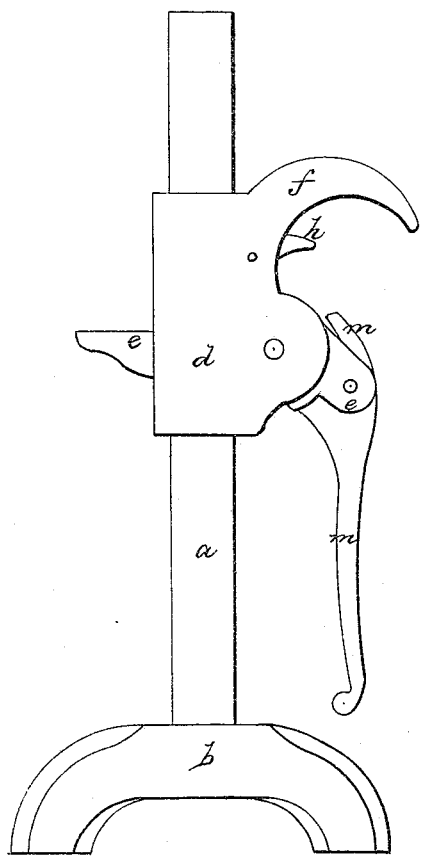
Figure 2:
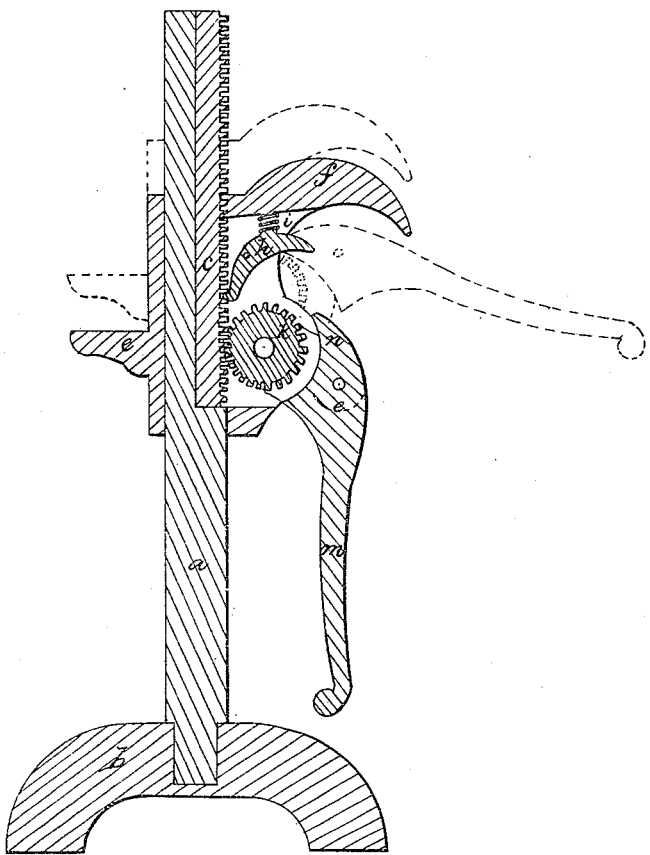

Figure 1 is a side elevation of my invention. Fig. 2 is a section of the same.

Similar letters of reference indicate like parts.

My invention consists in the use or employment of a small gear or pinion meshing into a rack on an upright, and operated by a jointed combined lever and pawl to raise a slide on said upright, which slide is held in position by another pawl meshing into the aforesaid rack.

$a$ designates the upright, secured to feet $b$ in any proper manner. $c$ designates the rack, secured to upright $a$. $d$ designates a sleeve or slide, provided with a horn or projection, $e$, to place under the axle, or whatever it is desired to raise, and also with a handle, $f$, projecting from the top of its front. Immediately beneath the handle $f$ is a pawl, $h$, meshing into the rack $c$, and held in position by spiral spring $i$.

Pivoted to sleeve $d$ and meshing into rack $c$ is a small gear or pinion, $k$. On the center of pinion $k$ is hung a jointed lever, $l$, the handle $m$ of which is a combined lever and pawl.

The weight of handle $m$ will cause it to fall and disengage the pawl $n$, and allow the pinion $k$ to play freely in rack $c$.

By placing the hand on handle $f$ and one finger under the pawl $h$ the spiral spring $i$ will be easily depressed, the pawl $h$ disengaged from the rack $c$, and the sleeve $d$ can be raised and lowered, as desired.

To use this lifter, I place it under the axle and raise or lower the sleeve $d$, as before described, until the horn $e$ strikes the under side of the axle, then raise the handle $m$, and the pawl $n$ will engage the teeth of the pinion $k$, when the whole jointed lever $l$ will move, and cause pinion $k$ to revolve and raise the sleeve $d$, while the pawl $h$ will engage the rack $c$, and hold the sleeve $d$ in its elevated position. If not raised enough, again lower the handle $n$, and proceed as before.

The red lines in Fig. 2 show the position of the different parts when operated.

By my invention I produce an article for a lifting-jack which is light and durable, and much more convenient than those in common use. It can be stopped at any desired point. It is operated by raising the handle, instead of bearing down. It occupies but a small space for storage, and can be made at the ordinary cost.

What I claim as new, and desire to secure by Letters Patent, is—

The combination of the sleeve $d$ with handle $f$ and projection $e$, rack $c$, pinion $k$, pawl $h$, and spring $i$, all combined and arranged substantially as described, and for the purposes herein set forth.

WILBUR F. ARNOLD.

Witnesses:
C. E. MITCHELL,
S. C. DUNHAM.